(12) United States Patent
Manuel

(10) Patent No.: US 9,154,374 B2
(45) Date of Patent: Oct. 6, 2015

(54) METHODS FOR ANALYZING NETWORK TRAFFIC AND DEVICES THEREOF

(71) Applicant: Wipro Limited, Bangalore (IN)

(72) Inventor: Suman Manuel, Kochi (IN)

(73) Assignee: Wipro Limited, Bangalore (IN)

( * ) Notice: Subject to any disclaimer, the term of this patent is extended or adjusted under 35 U.S.C. 154(b) by 143 days.

(21) Appl. No.: 13/875,056

(22) Filed: May 1, 2013

(65) Prior Publication Data

US 2014/0241145 A1   Aug. 28, 2014

(30) Foreign Application Priority Data

Feb. 28, 2013   (IN) .............................. 877/CHE/2013

(51) Int. Cl.
*H04L 12/24* (2006.01)
*H04L 12/26* (2006.01)

(52) U.S. Cl.
CPC ........ *H04L 41/0654* (2013.01); *H04L 41/0645* (2013.01); *H04L 41/0677* (2013.01); *H04L 41/0686* (2013.01)

(58) Field of Classification Search
None
See application file for complete search history.

(56) References Cited

U.S. PATENT DOCUMENTS

| | | | |
|---|---|---|---|
| 2005/0097405 A1* | 5/2005 | Sesek et al. ................... | 714/48 |
| 2007/0086434 A1* | 4/2007 | Venkatachalam et al. .... | 370/352 |
| 2010/0153787 A1* | 6/2010 | Beattie et al. .................. | 714/43 |

OTHER PUBLICATIONS

Decker, E., "Definitions of Managed Objects for Bridges", Network Working Group, Dec. 1991, pp. 1-38, (http://www.ietf.org/rfc/rfc1286.txt).
Oracle, "Monitoring Packet Transfers With the snoop Command", Oracle Solaris Administration: IP Services, 2012, (http://docs.oracle.com/cd/E23824_01/html/821-1453/gexkw.html).
"Solaris—Snoop (1)", Retrieved on Apr. 29, 2013, (http://www.cs.bgu.ac.il/~arik/usail/man/solaris/snoop.1.html).
Wikipedia, "Network Theory", Wikipedia, Retrieved on Apr. 29, 2013, pp. 1-6, (http://en.wikipedia.org/wiki/Network_theory).
Wikipedia, "Network Planning and Design", Wikipedia, Retrieved on Apr. 29, 2013, pp. 1-4, (http://en.wikipedia.org/wiki/Network_planning_and_design).
Wikipedia, "Fault Management", Wikipedia, Jan. 2011, pp. 1-2, (http://en.wikipedia.org/wiki/Fault_management).
Wikipedia, "HTTP Tunnel", Wikipedia, Sep. 2007, pp. 1-4, (http://en.wikipedia.org/wiki/HTTP_tunnel).

* cited by examiner

*Primary Examiner* — Kodzovi Acolatse
(74) *Attorney, Agent, or Firm* — LeClairRyan, a Professional Corporation

(57) ABSTRACT

A method, non-transitory computer readable medium and traffic analysis computing device for analyzing network traffic comprising sending to one or more network devices a request to capture one or more network information upon identifying a fault within a network. Next, one or more network reporting files comprising the captured one or more network information is received from each of the one or more network devices. Upon receiving the network reporting files, a location at which the identified fault occurred within the network is determined. Based on the determination, one or more corrective actions is performed at the location of the identified fault within the network.

12 Claims, 4 Drawing Sheets

```
Step 301    00 01 02 03 04 05 06 07 08 09 0a 0b 0c 0d 0e 0f
            ------------------------------------------------
     0x00 | Identification Pattern    | version no:   | datalink type Step 302    00 01 02 03 04 05 06 07 08 09 0a 0b 0c 0d 0e 0f
            ------------------------------------------------
     0x00   73 6F 6E 6E 70 00 00 00 00 00 00 02 00 00 00 04

Step 303    00 01 02 03 04 05 06 07 08 09 0a 0b 0c 0d 0e 0f
            ------------------------------------------------
                                       |version|
     0x00 |Identification Pattern| IP address | no: | datalink type |
          |                      |            |     |               |

Step 304    00 01 02 03 04 05 06 07 08 09 0a 0b 0c 0d 0e 0f
            ------------------------------------------------
     0x00   73 6F 6E 6E 70 00 C0 A8 79 92 00 02 00 00 00 04
```

FIG. 3

Step 401

```
+-+-+-+-+-+-+-+-+-+-+-+-+-+-+-+-+-+-+-+-+-+-+-+-+-+-+-+-+-+-+-+-+
|                                                               |
+                    Identification Pattern                     +
|                                                               |
+-+-+-+-+-+-+-+-+-+-+-+-+-+-+-+-+-+-+-+-+-+-+-+-+-+-+-+-+-+-+-+-+
|                      Version Number = 2                       |
+-+-+-+-+-+-+-+-+-+-+-+-+-+-+-+-+-+-+-+-+-+-+-+-+-+-+-+-+-+-+-+-+
|                         Datalink Type                         |
+-+-+-+-+-+-+-+-+-+-+-+-+-+-+-+-+-+-+-+-+-+-+-+-+-+-+-+-+-+-+-+-+
|                           IP address                          |
+-+-+-+-+-+-+-+-+-+-+-+-+-+-+-+-+-+-+-+-+-+-+-+-+-+-+-+-+-+-+-+-+
```

Step 402

```
        00  01  02  03  04  05  06  07  08  09  0a  0b  0c  0d  0e  0f
        ----------------------------------------------------------------
       |                                   | version |               |
0x00   |      Identification Pattern       |   no:   | datalink type |
       |                                   |         |               |
        ----------------------------------------------------------------
0x10   |      IP address   |<packet records starts here>
```

Step 403

```
        00  01  02  03  04  05  06  07  08  09  0a  0b  0c  0d  0e  0f
        ----------------------------------------------------------------
0x00    73  6F  6E  6E  70  00  00  00  00  00  00  02  00  00  00  04
0x10    C0  A8  79  92  |<-packet data starts here
```

FIG. 4

METHODS FOR ANALYZING NETWORK TRAFFIC AND DEVICES THEREOF

This application claims the benefit of Indian Patent Application Filing No. 877/CHE/2013, filed Feb. 28, 2013, which is hereby incorporated by reference in its entirety.

FIELD

This technology generally relates to traffic analysis, more particularly, to methods for analyzing network traffic and devices thereof.

BACKGROUND

With growing digitization and advancements in internet and telecommunication, there is a requirement for computer network system everywhere. Organizations and business houses now have infrastructure—either to sustain their current productivity with reliability and efficiency or to scale up to the next level. Nonetheless, whether such an infrastructure is a basic or a gigantic one, the network is managed by network administrator(s).

Traffic analysis refers to the activities, methods, procedures and tools that pertain to the operation, administration, maintenance and provisioning of networked systems. Functions that are performed as part of traffic analysis accordingly include controlling, planning, allocating, deploying, coordinating and monitoring the resources of a network. Of the many reasons, one prominent one is to capture information to analyze traffic and troubleshoot a network error or fault. Additionally, it is beneficial to know the location at which the information was captured which would further help analyze the network traffic better. While existing technologies includes various mechanisms, tools and solutions to analyze network traffic, unfortunately, existing technologies does not identify the exact location of capture of the information thereby making the process of identifying the location at which a network error or fault occurred a complex process.

SUMMARY

A method for analyzing network traffic includes a traffic analysis computing device for sending to one or more network devices a request to capture one or more network information upon identifying a fault within a network. Next, the traffic analysis computing device receives one or more network reporting files comprising the captured one or more network information from each of the one or more network devices. Upon receiving the network reporting files, the traffic analysis computing device determines a location at which the identified fault occurred within the network. Based on the determination, one or more corrective actions is performed at the location of the identified fault within the network by the traffic analysis computing device.

A non-transitory computer readable medium having stored thereon instructions for analyzing network traffic comprising machine executable code which when executed by at least one processor, causes the processor to perform steps including sending to one or more network devices a request to capture one or more network information upon identifying a fault within a network. Next, one or more network reporting files comprising the captured one or more network information is received from each of the one or more network devices. Upon receiving the network reporting files, a location at which the identified fault occurred within the network is determined. Based on the determination, one or more corrective actions is performed at the location of the identified fault within the network.

A traffic analysis computing device comprising one or more processors, a memory, wherein the memory coupled to the one or more processors which are configured to execute programmed instructions stored in the memory including sending to one or more network devices a request to capture one or more network information upon identifying a fault within a network. Next, one or more network reporting files comprising the captured one or more network information is received from each of the one or more network devices. Upon receiving the network reporting files, a location at which the identified fault occurred within the network is determined. Based on the determination, one or more corrective actions is performed at the location of the identified fault within the network.

This technology provides a number of advantages including providing more effective methods, non-transitory computer readable medium and devices for analyzing network traffic. Additionally, this technology provides methods and techniques for easier identification of the exact location at which a network fault or error occurred using the source internet protocol address in a received network reporting file.

BRIEF DESCRIPTION OF THE DRAWINGS

FIG. 3 is an exemplary arrangement of a header information; and

FIG. 4 is another exemplary arrangement of the header information.

DETAILED DESCRIPTION

Figure 1:
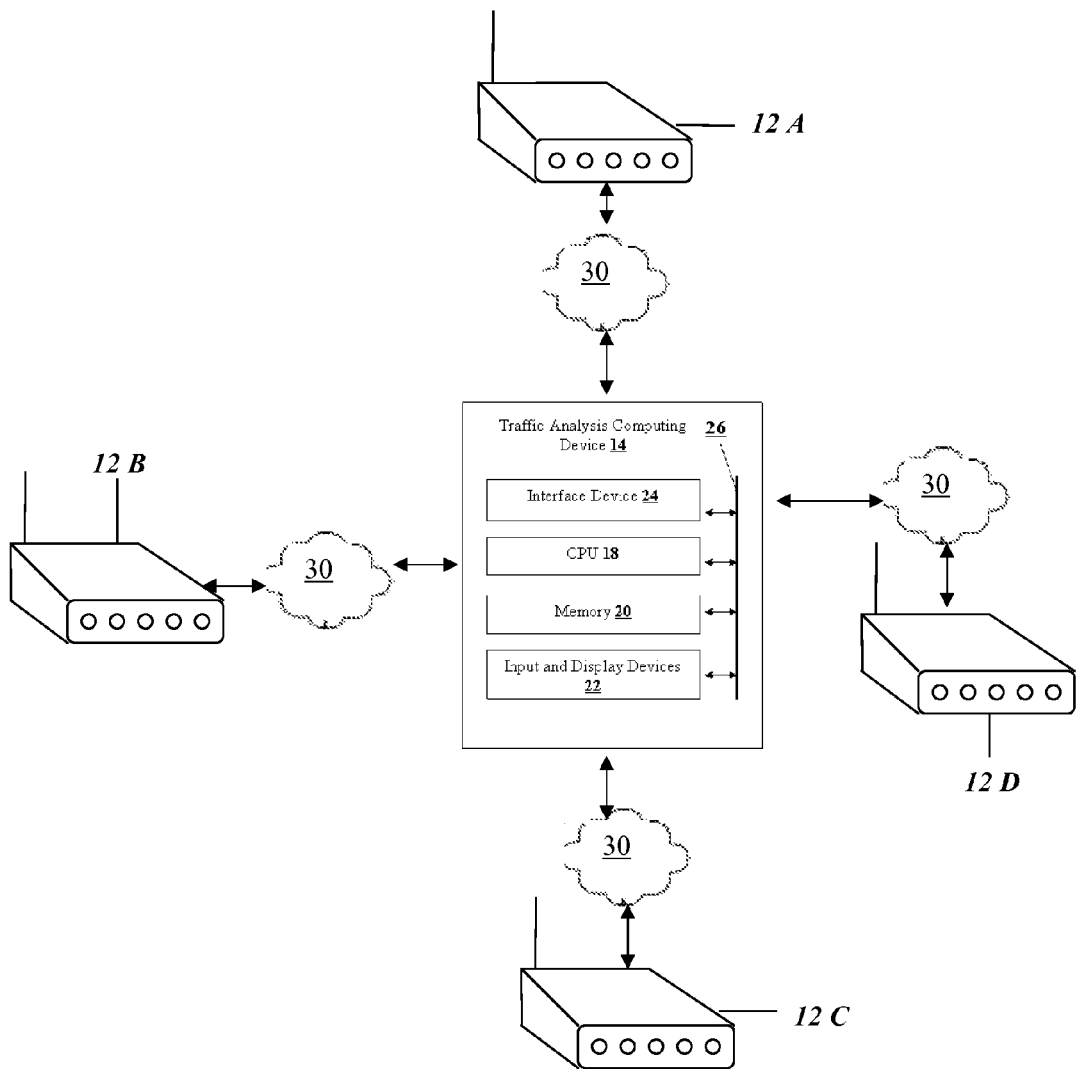
FIG. 1 is an exemplary network environment which comprises a traffic analysis computing device for analyzing network traffic.

An exemplary network environment 10 with a traffic analysis computing device 14 for analyzing network traffic as illustrated in FIG. 1. The exemplary environment 10 includes a plurality of network devices 12(A)-12(D), the traffic analysis computing device 14 which are coupled together by the communication network 30, although the environment can include other types and numbers of devices, components, elements and communication networks in other topologies and deployments. While not shown, the exemplary environment 10 may include additional components, such as routers, switches and other devices which are well known to those of ordinary skill in the art and thus will not be described here. This technology provides a number of advantages including providing more effective methods, non-transitory computer readable medium and devices for analyzing network traffic, although this method can be used to manage other types of network.

Referring more specifically to FIG. 1, traffic analysis computing device 14 interacts with the network elements 12(A)-12(D) through the communication network 30, although the traffic analysis computing device 14 can interact with the network elements 12(A)-12(D) using any other methods or techniques. As it would be appreciated by a person having ordinary skill in the art, communication network 30 in this technology includes local area networks (LAN), wide area network (WAN), 3G technologies, GPRS or EDGE technologies, although the communication network 30 can include any other network topologies.

The traffic analysis computing device 14 analyzes network traffic within a network environment 10 as illustrated and described with the examples herein, although traffic analysis computing device 14 may perform other types and numbers of functions. The traffic analysis computing device 14 includes at least one processor 18, memory 20, input and display devices 22, and interface device 24 which are coupled together by bus 26, although traffic analysis computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2:
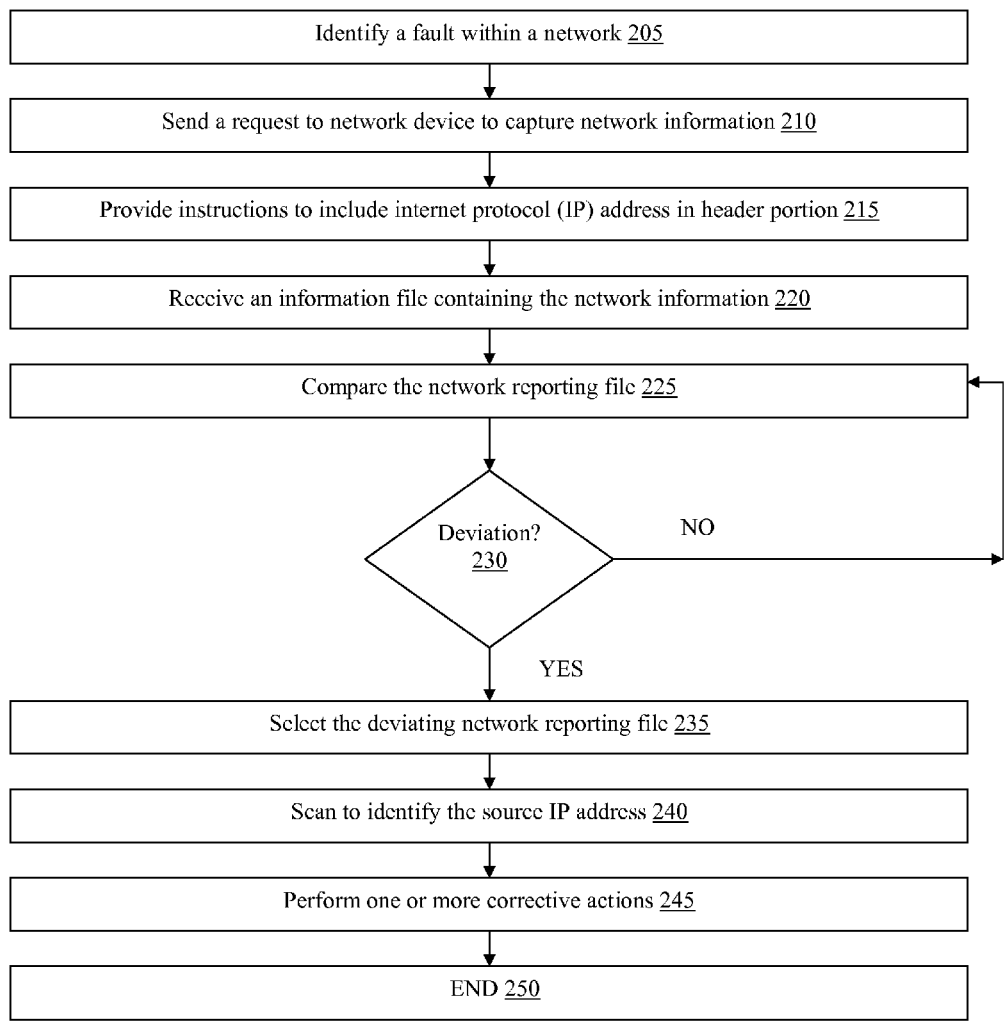
FIG. 2 is a flowchart of an exemplary method for analyzing network traffic.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more programmed instructions of this technology as illustrated and described with reference to the examples herein that may be executed by the one or more processor(s) 18. The flow chart shown in FIG. 2 is representative of example steps or actions of this technology that may be embodied or expressed as one or more non-transitory computer or machine readable having stored instructions stored in memory 20 that may be executed by the processor(s) 18.

Input and display devices 22 enable a user, such as an administrator, to interact with the traffic analysis computing device 14, such as to input and/or view data and/or to configure, program and/or operate it by way of example only. Input devices may include a touch screen, keyboard and/or a computer mouse and display devices may include a computer monitor, although other types and numbers of input devices and display devices could be used.

The interface device 24 in the traffic analysis computing device 14 is used to operatively couple and communicate between the traffic analysis computing device 14, the network elements 12 and which are all coupled together by communication network 30.

In this example, the bus 26 is a hyper-transport bus in this example, although other bus types and links may be used, such as PCI.

Each of the network elements 12(A)-12(D) includes a central processing unit (CPU) or processor, a memory, an interface device, and an I/O system, which are coupled together by a bus or other link, although other numbers and types of network devices could be used. Each of the network elements 12(A)-12(D) communicate with the traffic analysis computing device 14 through communication network 30, although the network elements 12(A)-12(D) can interact with the traffic analysis computing device 14 by any other means.

Although an exemplary network environment 10 with the multiple network elements 12(A)-12(D) and traffic analysis computing device 14 are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as programmed instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for analyzing network traffic will now be described with reference to FIGS. 1-4. In step 205, the traffic analysis computing device 14 identifies a fault in network traffic while monitoring the network devices 12(A)-12 (D). By way of example only, the traffic analysis computing device 14 identifies a fault in the network for having extremely slow internet connection, although the traffic analysis computing device 14 can identify faults or error in a network based on any other parameters or using any other techniques. However, the traffic analysis computing device 14 is unaware of the exact location and the exact network device 12(A)-12(D) because of which the fault was observed. Alternatively, the traffic analysis computing device 14 can receive a notification from any other external source indicating a fault in the network traffic.

Next in step 210, upon identifying a fault within the traffic analysis computing device 14 sends a request to all the network devices 12(A)-12(D) to execute a snoop protocol to capture network information in a network reporting file, although the traffic analysis computing device 14 can request the network devices 12(A)-12(D) to perform any other operation. As it would be appreciated by a person having ordinary skill in the art, the working and the specification of the snoop protocol has been herein incorporated by reference. By way of example only, the traffic analysis computing device 14 requests the network devices 12(A)-12(D) to capture network information such as details of transmission control protocol (TCP) connection, user datagram protocol (UDP) related information, the observed bandwidth at the network device 12(A)-12(D), although the traffic analysis computing device 14 can requested the network devices 12(A)-12(D) to capture any other information related to the network traffic.

Next in step 215, the traffic analysis computing device 14 provides additional instructions to all the network devices 12(A)-12(D) to include their internet protocol (IP) address in the header portion of the network reporting file, although the traffic analysis computing device 14 can instruct the network devices 12(A)-12(D) to include their internet protocol (IP) address at any other location in the network reporting file.

As it would be appreciated by a person having ordinary skill in the art, in this example, the traffic analysis computing device 14 can instruct the network devices 12(A)-12(D) to rearrange the header to include the source IP address of the network devices 12(A)-12(D) as further illustrated in FIG. 3. Step 301 of FIG. 3 illustrates the header arrangement including an identification pattern field, a version number field and a data link type field of the network reporting file. Next, step 302 includes corresponding values in each of the header fields. However, as observed in step 302, the octets 05-07, 08-09 and 0c-0d are unused and includes 00 as values. Accordingly, the traffic analysis computing device 14 instructs the network devices 12(A)-12(D) to rearrange octets 06-09 in such a way that the source IP address of the network devices 12(A)-12(D) can be stored as illustrated in step 303 of FIG. 3. In this example, the source IP address of one of the network device 12(C) is 192.168.121.146 and with the above illustrated rearrangement of the octets, step 304 illustrates octets 06-09 having the source IP address 192.168.121.146.

Alternatively, in another example, the traffic analysis computing device 14 can instruct the network devices 12(A)-12(D) to increment the header size by 32 bits from 128 bits to 160 to accommodate the source IP address of the network device 12(A)-12(D). Accordingly, the header with the incrementing the header size by 32 bits is illustrated in step 401 and step 402 of FIG. 4. By way of example only, if the source IP address of the network device 12(C) is 192.168.121.146, by incrementing the header size by 32 bits, the source IP address would be represented as illustrated in step 403 of FIG. 4.

Switching back to the explanation of FIG. 2, in step 220, the traffic analysis computing device 14 receives the network reporting file from each of the network devices 12(A)-12(D) where each of the network reporting file includes the IP address of their corresponding network devices 12(A)-12(D), although the traffic analysis computing device can receive any amounts of any additional information from the network devices 12(A)-12(D). As previously illustrated, the network reporting file includes transmission control protocol (TCP) connection information, user datagram protocol (UDP) related information, the observed bandwidth, although the network reporting file can include any amounts of any other information.

In step 225, the traffic analysis computing device 14 compares values present in each field of the received network reporting file to standard values of the fields present in a standard network reporting file stored within the memory 20.

In step 230, the traffic analysis computing device 14 determines if there was a deviation was observed in one of the values of the network information while comparing each of the received network reporting files with the standard network reporting file. If the traffic analysis computing device 14 determines that a deviation was observed, a Yes branch is taken to step 235, else a No branch is taken back to step 225. In this example, the traffic analysis computing device determines that there was a deviation in the network reporting file received from network device 12(C).

In step 235, once the traffic analysis computing device 14 identifies a deviation in one of the value in the received network reporting file, in this example, the traffic analysis computing device 14 selects the deviating network reporting file for further processing. In this example, the traffic analysis computing device 14 identifies a deviation (reduction) in the bandwidth value in the network reporting file received from network device 12(C) and selects the network reporting file received from network device 12(C) for further processing.

Next, in step 240, the traffic analysis computing device 14 scans the selected deviating network reporting file to identify the source IP address of the deviating network reporting file and thereby to identify the place from which the deviating network reporting file was captured, although the traffic analysis computing device 14 can perform any other operation on the deviating network reporting file. By identifying the place at which the deviating network reporting file was captured, the traffic analysis computing device 14 identifies the location at which the fault was identified within the network. In this example, the traffic analysis computing device 14 scans the deviating network reporting file received from network device 12(C) to identify the source IP address (192.168.121.146) of the network device 12(C). Additionally, by scanning only the source IP address of the deviating file, the technology disclosed provides advantages of efficiently identifying the location at which the fault occurred as opposed to scanning the source IP address of all of the received network reporting files.

In step 245, the traffic analysis computing device 14 performs one or corrective actions to rectify the observed fault only at the location at which the fault was observed, although the traffic analysis computing device 14 can perform any other operations at any other locations. In this example, the traffic analysis computing device 14 decides to increase the bandwidth at the network device 12(C) to rectify the observed slowness in the observed internet connection and the exemplary process ends in step 250. Alternatively, the traffic analysis computing device 14 can provide one or more suggestions to rectify the observed fault in the network.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for analyzing network traffic comprising:
    sending by a traffic analysis computing device to one or more network devices a request to capture one or more network information upon identifying a fault within a network, wherein the sending further comprises providing one or more instructions to each of the one or more network devices to include a source internet protocol address of the one or more network devices in a header portion of one or more network reporting files, the header portion comprising an identification pattern, and a datalink type and wherein the one or more instructions comprises increasing a size of the header portion from one hundred and twenty eight bits to at most of one hundred and sixty bits;
    receiving by the traffic analysis computing device the one or more network reporting files comprising the captured one or more network information from each of the one or more network devices, the one or more network reporting files being received through corresponding one or more network connections;
    determining by the traffic analysis computing device a location at which the identified fault occurred within the network, the determining the location being based on analysis of the one or more network connections independent of each other; and
    performing by the traffic analysis computing device one or more corrective actions at the location of the identified fault within the network based on the determination.

2. The method as set forth in claim 1 wherein the determining the location further comprises:
    comparing by the traffic analysis computing device each of the received one or more network reporting files against a standard network reporting file to identify at least one of the one or more network reporting files which is deviating from the standard network reporting file; and identifying by the traffic analysis computing device a place at which the deviating network reporting file was captured to determine the location at which the identified network fault occurred.

3. The method as set forth in claim 2 further comprising scanning by the traffic analysis computing device the header portion of the deviating network reporting file to identify the source internet protocol address of the deviating network reporting file to identify the place at which the deviating network reporting file was captured.

4. The method as set forth in claim 1 further comprising analyzing by the traffic analysis computing device the network traffic at the determined location at which the fault was identified prior to the performing.

5. A non-transitory computer readable medium having stored thereon instructions for analyzing network traffic comprising machine executable code which when executed by at least one processor, causes the processor to perform steps comprising:

sending to one or more network devices a request to capture one or more network information upon identifying a fault within a network, wherein the sending further comprises providing one or more instructions to each of the one or more network devices to include a source internet protocol address of the one or more network devices in a header portion of one or more network reporting files, the header portion comprising an identification pattern, and a datalink type and wherein the one or more instructions comprises increasing a size of the header portion from one hundred and twenty eight bits to at most of one hundred and sixty bits;

receiving by the traffic analysis computing device one or more network reporting files comprising the captured one or more network information from each of the one or more network devices, the one or more network reporting files being received through corresponding one or more network connections;

determining by the traffic analysis computing device a location at which the identified fault occurred within the network, the determining the location being based on analysis of the one or more network connections independent of each other; and performing by the traffic analysis computing device one or more corrective actions at the location of the identified fault within the network based on the determination.

6. The medium as set forth in claim 5 wherein the determining the location further comprises:

comparing each of the received one or more network reporting files against a standard network reporting file to identify at least one of the one or more network reporting files which is deviating from the standard network reporting file; and identifying a place at which the deviating network reporting file was captured to determine the location at which the identified network fault occurred.

7. The medium as set forth in claim 6 further comprising scanning the header portion of the deviating network reporting file to identify the source internet protocol address of the deviating network reporting file to identify the place at which the deviating network reporting file was captured.

8. The medium as set forth in claim 5 further comprising analyzing the network traffic at the determined location at which the fault was identified prior to the performing.

9. A traffic analysis computing device comprising:

one or more processors;

a memory, wherein the memory coupled to the one or more processors which are configured to execute programmed instructions stored in the memory comprising:

sending to one or more network devices a request to capture one or more network information upon identifying a fault within a network, wherein the sending further comprises providing one or more instructions to each of the one or more network devices to include a source internet protocol address of the one or more network devices in a header portion of one or more network reporting files, the header portion comprising an identification pattern, and a datalink type and wherein the one or more instructions comprises increasing a size of the header portion from one hundred and twenty eight bits to at most of one hundred and sixty bits;

receiving by the traffic analysis computing device one or more network reporting files comprising the captured one or more network information from each of the one or more network devices, the one or more network reporting files being received through corresponding one or more network connections;

determining by the traffic analysis computing device a location at which the identified fault occurred within the network, the determining the location being based on analysis of the one or more network connections independent of each other; and performing by the traffic analysis computing device one or more corrective actions at the location of the identified fault within the network based on the determination.

10. The device as set forth in claim 9 wherein the one or more processors is further configured to execute programmed instructions stored in the memory for the determining further comprising:

comparing by the traffic analysis computing device each of the received one or more network reporting files against a standard network reporting file to identify at least one of the one or more network reporting files which is deviating from the standard network reporting file; and identifying by the traffic analysis computing device a place at which the deviating network reporting file was captured to determine the location at which the identified network fault occurred.

11. The device as set forth in claim 10 wherein the one or more processors is further configured to execute programmed instructions stored in the memory further comprising scanning the header portion of the deviating network reporting file to identify the source internet protocol address of the deviating network reporting file to identify the place at which the deviating network reporting file was captured.

12. The device as set forth in claim 9 wherein the one or more processors is further configured to execute programmed instructions stored in the memory further comprising analyzing the network traffic at the determined location at which the fault was identified prior to the performing.

\* \* \* \* \*